United States Patent [19]

Smith

[11] Patent Number: 4,812,157

[45] Date of Patent: Mar. 14, 1989

[54] APPARATUS FOR FORMING GLASS SHEETS

[76] Inventor: Quintin R. Smith, 317 E. Fourth St., Port Clinton, Ohio 43452

[21] Appl. No.: 116,873

[22] Filed: Nov. 5, 1987

[51] Int. Cl.$^4$ ............................................. C03B 23/02
[52] U.S. Cl. ..................................... 65/273; 65/289; 65/291; 65/359
[58] Field of Search ........................ 65/90, 92, 94, 102, 65/103, 107, 273, 289, 290, 291, 361, 357, 359

[56] References Cited

U.S. PATENT DOCUMENTS

| | | | |
|---|---|---|---|
| 2,297,315 | 9/1942 | Owen | 65/287 |
| 3,123,459 | 3/1964 | Hens | 65/106 |
| 4,018,589 | 4/1977 | Egbert et al. | 65/287 |
| 4,119,428 | 10/1978 | DeAngelis | 65/287 |
| 4,217,126 | 8/1980 | Hagedorn et al. | 65/106 |
| 4,292,065 | 9/1981 | Nedlec et al. | 65/104 |
| 4,361,432 | 11/1982 | McMaster et al. | 65/104 |
| 4,488,893 | 12/1984 | Claassen et al. | 65/287 |
| 4,525,196 | 6/1985 | Fecik et al. | 65/287 |
| 4,556,407 | 12/1985 | Fecik et al. | 65/289 |
| 4,556,408 | 12/1985 | Fecik et al. | 65/289 |
| 4,597,789 | 7/1986 | Reese | 65/106 |

Primary Examiner—Robert L. Lindsay
Attorney, Agent, or Firm—Willian Brinks Olds Hofer Gilson & Lione

[57] ABSTRACT

An adjustable glass forming apparatus includes a peripheral frame having a shape which generally conforms to the shape of the glass sheet to be formed. Though preferably defining an L-shape in cross section, the frame may define other suitably rigid cross sections. A plurality of adjustable supports are disposed in close proximity about the frame. Each support includes a curved upper surface which contacts the lower face of the glass and a stanchion or shank which is received within a suitable opening in the frame. Preferably, the shank and opening define complementary male and female threads or other adjustable structures. The support may be readily adjusted up or down by rotation thereof and a jam nut maintains the support in the selected position.

20 Claims, 1 Drawing Sheet

U.S. Patent — Mar. 14, 1989 — 4,812,157
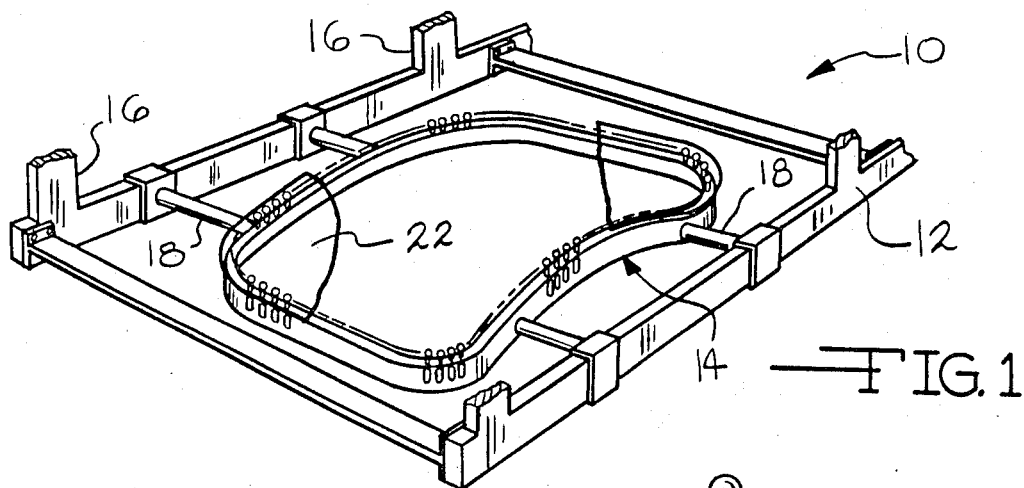
FIG. 1
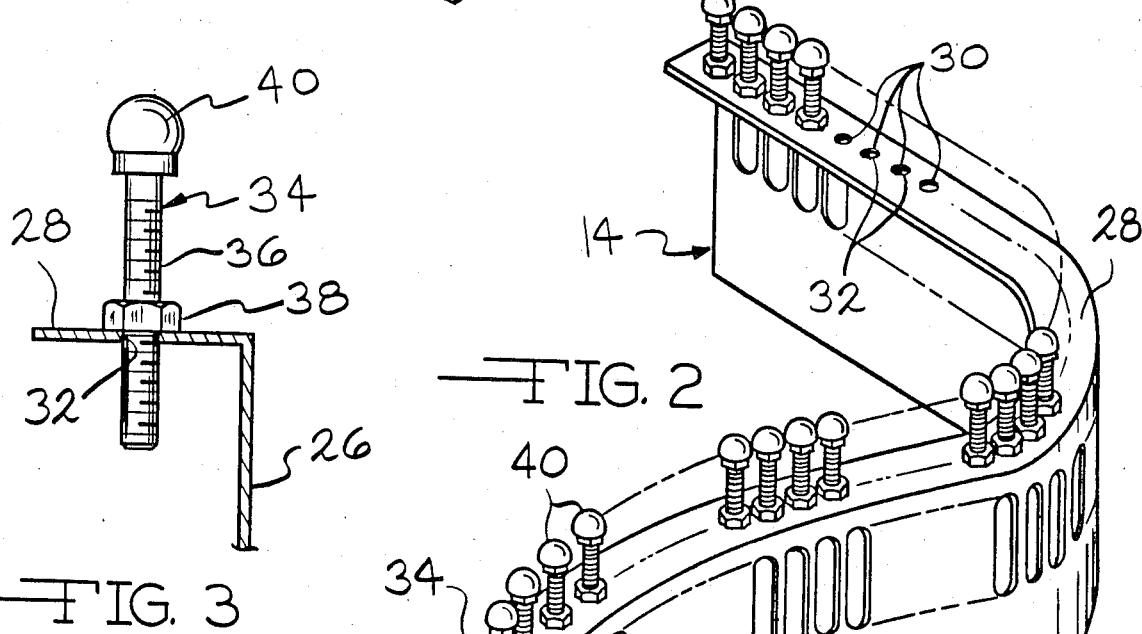
FIG. 2
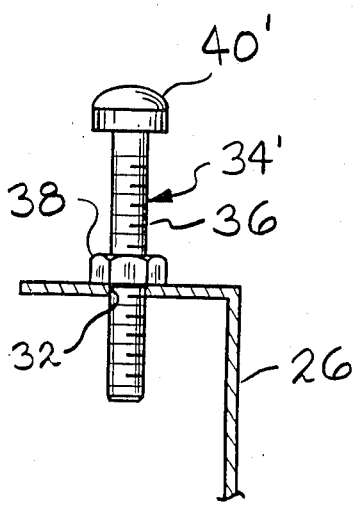
FIG. 3
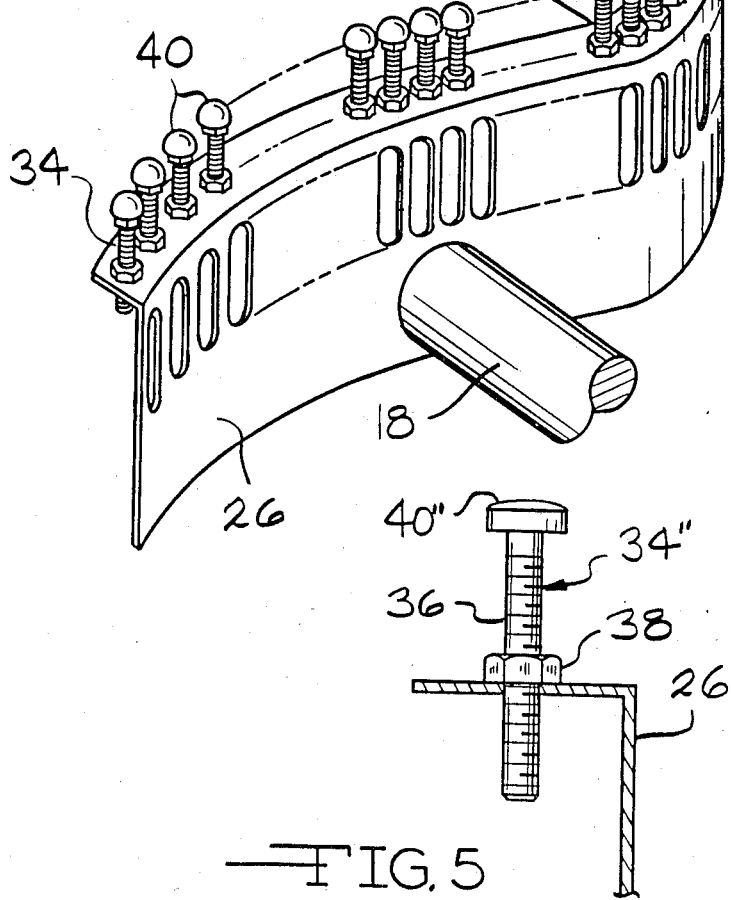
FIG. 4
FIG. 5

APPARATUS FOR FORMING GLASS SHEETS

BACKGROUND OF THE INVENTION

The invention relates generally to frames or rings for forming glass sheets and more particularly to a frame or ring which conforms to the periphery of the glass sheet or panel to be molded and which includes a plurality of adjustable supports disposed thereabout.

Immediately in line behind architectural glass as the foremost application for various compositions and structures of glass are vehicular applications. Whereas architectural applications initially and presently utilize glass in its planar state, applications in vehicles though once requiring planar glass have increased significantly in complexity through this century. Such early applications typically required only the peripheral shaping or grinding of planar glass to conform to window openings. As vehicular bodies became more streamlined and aesthetic considerations became increasingly important, the role of glass in achieving such considerations has likewise increased. Complexly curved glass lights for automobiles have become commonplace.

The equipment which produces such curved glass has undergone a corresponding program of change and increased sophistication. The change has not been a simple one, for the physical shape of the glass end product is not the sole requirement. Of equal if not greater importance are the of optical properties of the glass particularly the transmission of true images therethrough. These competing demands have placed significant burdens upon the manufacturers of vehicular glass products.

Numerous patents have been granted to inventions relating to adjustable glass supports and molds. For example, U.S. Pat. Nos. 4,018,589 and 4,522,641 generally disclose mechanically adjustable supports. The former patent provides two axes of adjustability and the latter patent provides three axes of adjustability.

Other patents which disclose peripheral height adjustment means include U.S. Pat. Nos. 2,297,315, 4,488,893 and 4,508,556. All of these patents teach adjustable peripheral support means which coact with a peripheral glass support frame.

Adjustability, per se, is not the only goal of such support frames and ease of adjustability is also a major consideration. Since the frame may distort or wear away with age, it is necessary that means be provided to compensate for same. U.S. Pat. Nos. 4,556,407 and 4,556,408 disclose spaced apart pivotally disposed rectangular supports which are vertically adjustable. In the latter patent, the supports are slidably positioned within a track-like frame.

A review of the foregoing patents reveals that improvements in the field of adjustable glass molds are both possible and desirable.

SUMMARY OF THE INVENTION

The invention relates to an adjustable glass forming frame or ring for accurately shaping and conforming the periphery of glass sheets to be used in, for example, automobiles, motor vehicles and in all applications requiring accurately formed complexly curved glass panels. The glass forming apparatus includes a peripheral frame having a shape which conforms generally to the shape of the glass sheet to be formed. The frame is preferably supported by and secured within a machine carriage which is adaptable to conveying through an associated glass forming or tempering oven. The frame preferably defines an L-shape in cross section although it may readily comprehend other suitably rigid cross sections such as a U-shape or box frame if desired. A plurality of adjustable supports are disposed in close proximity about the entire periphery of the frame and are individually adjustable along parallel vertical axes. Each support includes a curved upper surface which contacts the lower surface of the glass adjacent its periphery and a stanchion or shank which is received within a complementary opening in the frame. Preferably, the stanchion or shank is threaded and the opening is complementarily threaded such that rotation of the support raises or lowers the upper supporting surface thereby adjusting the proximate periphery of the supported glass upwardly or downwardly. A device such as a jam nut on each stanchion may be utilized to tighten against the frame and maintain the support in its selected position.

Thus it is an object of the present invention to provide a glass forming frame having a periphery which supports and conforms to the periphery of the glass sheet to be shaped.

It is a further object of the present invention to provide a glass forming frame having a plurality of individual supports about its periphery for supporting a similarly shaped glass sheet about its periphery.

It is a still further object of the present invention to provide a glass forming frame having a plurality of closely spaced, individually adjustable threaded supports for supporting a similarly shaped sheet of glass about its periphery.

Further objects and advantages of the present invention will become apparent by reference to the following description of the preferred embodiment and appended drawings wherein like reference numerals appearing in the various drawing figures represent the same feature or component of the invention.

BRIEF DESCRIPTION OF THE DRAWINGS

FIG. 1 is a perspective view of a glass forming frame according to the present invention supported by a frame conveying carriage;

FIG. 2 is an enlarged fragmentary view of a glass forming frame according to the present invention;

FIG. 3 is a further enlarged fragmentary, sectional view of a glass sheet support according to the present invention;

FIG. 4 is a further enlarged fragmentary, sectional view of a first alternate embodiment of a glass sheet support according to the present invention; and FIG. 5 is a further enlarged fragmentary, sectional view of a second alternate embodiment of a glass sheet support according to the present invention.

DESCRIPTION OF THE PREFERRED EMBODIMENT

Referring now to FIG. 1, a glass forming assembly according to the present invention is illustrated and generally designated by the referenced numeral 10. The glass forming assembly 10 includes a generally rectangular carriage 12 which defines a rigid framework for supporting a frame assembly 14 according to the present invention and coupling it by suitable supports such as legs 16 to an associated conveyor mechanism (not illustrated) for transporting the glass forming assembly 10 through a tempering or forming oven (also not illustrated). Preferably, a plurality of lateral supports 18 are adjustable and/or moveable in order to receive and position various frame assemblies 14 on the carriage 12 in order to enhance its versatility as will be readily appreciated. A sheet or panel of glass 22 which generally conforms to the selected peripheral shape of the frame assembly 14 is positioned thereupon in order to conform it to the selected shape as those familiar with glass forming operations will readily appreciate.

Referring now to FIG. 2, the frame assembly 14 is illustrated and includes a peripheral frame member 26 having a periphery, in plan view, which generally conforms to the shape of the sheet of glass 22 to be placed thereupon. The frame member 26 may be L-shaped as illustrated, such that it defines a generally horizontal upper surface 28, or may be U-shaped having a flat upper surface 28, a box girder or other cross sectional shape having suitable rigidity. Disposed in relatively close proximity along the upper surface 28 of the frame assembly 14 are a plurality of aligned and spaced-apart apertures 30. The apertures 30 include female threads 32 of conventional standard thread forms.

Referring now to FIG. 3, into each of the threaded apertures 30 about the periphery of the frame assembly 14 is disposed a stanchion 34 having male threads 36 complementary to the threads 32 of the apertures 30 disposed along their lengths. A nut 38 having threads complementary to those threads 36 on the stanchion 34 is received upon each stanchion 34 preferably adjacent the upper surface 28 of the frame assembly 14. The nut 38 functions as a jam nut which may be tightened against the upper surface 28 to maintain the selected position of the stanchion 34 as will be readily appreciated. At the upper terminus of the stanchion 34 is disposed a spherical or hemi-spherical support 40. The spherical support 40 may be fabricated of any suitable material which is impervious to temperatures encountered within glass forming equipment. The diameter of the spherical support 40 is preferably in the range of from approximately 0.25 inches to 1.00 inches or larger and ideally about 0.375 inches. It will be appreciated that the smaller diameter supports 40 will have a smaller area of contact with the sheet of glass 22 and thus increased force per unit area and vice versa. As illustrated in FIG. 2, the spacing between adjacent center axes of the stanchions 34, that is, center-to-center distance, is preferably between approximately 0.375 inches and 1.00 inches or larger and ideally about 0.625 inches. In effect, the plurality of stanchions 34 and specifically the plurality of spherical supports 40 are intended to provide a substantially continuous though in fact discrete and individually adjustable series of support points for a sheet of glass 22. It will be readily appreciated that the hemi-spherical supports 40 of the stanchions 34 may be readily adjusted upwardly and downwardly both absolutely and relative to the adjacent stanchions 34 by loosening the jam nut 38, rotating the stanchions 34 in either a clockwise or counterclockwise direction as desired to lower or raise the stanchion 34 and retightening the jam nut 38 when the stanchion 34 or specifically the support 40 has been positioned as desired.

FIG. 4 illustrates a first alternate embodiment of a stanchion 34' having threads 36 and a jam nut 38. The head of the stanchion 34' defines an elliptical support 40' which, but for said elliptical shape, is identical in all respects to the preferred embodiment stanchion 34. The elliptical support 40 defines a somewhat flattened upper surface and thus generally will contact the sheet of glass 22 over a somewhat larger area as will be readily appreciated.

Likewise, in FIG. 5, a second alternate embodiment stanchion 34" is illustrated. The second alternate embodiment stanchion 34" includes threads 36 and a jam nut 38 which is secured against the frame member 26. The second alternate embodiment stanchion 34" is substantially similar to the preferred and alternate embodiment stanchions 34 and 34', respectively, except that it includes a curved or arcuate support 40". The shape of the curved or arcuate support 40" is exaggerated to illustrate it more clearly in FIG. 5 but all nature of curved and arcuate configurations are deemed to be comprehended by this embodiment. Furthermore, it will be obvious to those skilled in the art that the radius of the curved support 40" may be increased to the extent that it is effectively planar. This configuration is, as well, deemed to be within the scope of the invention. In plan view, all of the embodiments of the support 40 are circular. This configuration facilitates minimum center-to-center spacing of the supports 40. It should be appreciated that square or polygonal (in plan view) supports 40 having variously curved upper surfaces are wholly satisfactory for the intended purpose and, as such, are also deemed to be within the scope of the invention.

The present invention provides a means of accurately and specifically adjusting the planar position of a very small or relatively large portion of the periphery of the panel or sheet of glass 22 as it is heated and conformed to the frame assembly 14 of the present invention which represents the desired final shape of the sheet of glass 22. It will be readily appreciated that the frame assembly 14 according to the present invention permits and in fact facilitates careful and exact adjustment of a portion of the periphery of a sheet of glass 22 in order to achieve a desired shape. Such adjustment can be minor to compensate for variables in a production process or minor design changes or can be major to re-adapt a specific frame member 26 to produce a substantially differently curved sheet of glass 22 without requiring the necessity of a completely new frame as would be the case if the peripheral positions represented by the tops of the supports 40 were permanently fixed and unadjustable.

The foregoing disclosure is the best mode devised by the inventor for practicing this invention. It is apparent, however, that apparatus incorporating modifications and variations will be obvious to one skilled in the art of glass forming and tempering. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. An adjustable glass forming apparatus comprising, in combination,
   a frame conforming substantially to the shape of a glass panel, said frame including means for receiving a plurality of supports,
   means for positioning said frame in a substantially horizontal orientation,
   a plurality of free standing adjustable supports disposed about said frame in said support receiving means, each of said supports including a surface for supporting an edge adjacent region of said glass panel and means disposed between said support receiving means and said surface for adjusting the vertical position of said surface to adjust the supported height of said edge adjacent region of said glass panel.

2. The adjustable glass forming apparatus of claim 1 wherein said surface of said supports is hemi-spherical.

3. An adjustable glass forming apparatus comprising, in combination,
- a peripheral frame conforming substantially to the shape of a glass panel to be formed and defining a plurality of spaced-apart threaded apertures,
- means for positioning said frame in a substantially horizontal orientation,
- a plurality of free standing adjustable supports disposed in said threaded apertures, each of said supports including a curved surface for supporting an edge adjacent region of said glass panel and threaded means for adjusting the vertical position of said curved surface.

4. The adjustable glass forming apparatus of claim 1 wherein said adjusting means includes a threaded shank and said support receiving means includes a complementarily threaded aperture in said frame.

5. The adjustable glass forming apparatus of claim 4 wherein said threaded shank further includes a jam nut disposed thereon.

6. The ajustable glass forming apparatus of claim 1 wherein said surface of said suports is elliptical in cross section.

7. The adjustable glass forming apparatus of claim 1 wherein said surface of said supports is curved.

8. The adjustable glass forming apparatus of claim 1 wherein said supports are spaced no more than one inch apart on center.

9. The adjustable glass forming apparatus of claim 1 wherein said supports are no larger than one inch in diameter.

10. An adjustable glass forming apparatus comprising, in combination,
- a frame substantially conforming to the shape of a glass panel to be formed said frame including a plurality of means for receiving a plurality of supports,
- means for positioning said frame in a substantially horizontal orientation,
- a plurality of free standing supports disposed about said frame in said plurality of said support receiving means, each of said supports including a curved surface for supporting an edge adjacent region of said glass panel and means disposed between said support receiving means and said curved surface for adjusting the vertical position of said curved surface.

11. The adjustable glass forming apparatus of claim 10 wherein said curved surface is spherical.

12. The adjustable glass forming apparatus of claim 10 wherein said curved surface is elliptical in cross section.

13. The adjustable glass forming apparatus of claim 10 wherein said support is fabricated of a heat impervious material.

14. The adjustable glass forming apparatus of claim 10 wherein said adjustable supports include a threaded shank received within a complementarily threaded opening in said peripheral frame.

15. The adjustable glass forming apparatus of claim 14 wherein said threaded shank includes a jam nut disposed thereon.

16. The adjustable glass forming apparatus of claim 10 wherein said adjustable supports are spaced less than an inch apart on center.

17. The adjustable glass forming apparatus of claim 10 wherein said adjustable supports are less than one inch in diameter.

18. The adjustable glass forming apparatus of claim 3 further including a jam nut disposed on said threaded means.

19. The adjustable glass forming apparatus of claim 3 wherein said curved supports are hemi-spherical.

20. The adjustable glass forming apparatus of claim 3 wherein said frame is supported by a carriage for moving said frame through a glass heating apparatus.

* * * * *